(12) United States Patent
Chen et al.

(10) Patent No.: US 7,965,441 B2
(45) Date of Patent: Jun. 21, 2011

(54) OPTICAL FILM WITH SUPER LOW RETARDATION AND POLARIZING PLATE CONTAINING THE SAME

(75) Inventors: Shih-Ming Chen, Hsinchu (TW); Young-Jen Lee, Changhua County (TW); Tzong-Ming Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 783 days.

(21) Appl. No.: 11/806,020

(22) Filed: May 29, 2007

(65) Prior Publication Data
US 2007/0229953 A1   Oct. 4, 2007

Related U.S. Application Data

(63) Continuation-in-part of application No. 10/954,824, filed on Sep. 30, 2004, now Pat. No. 7,486,442.

(30) Foreign Application Priority Data

Dec. 28, 2006 (TW) ............... 95149476 A

(51) Int. Cl.
*G02B 5/30* (2006.01)
(52) U.S. Cl. ............... 359/489.07; 359/489.01; 428/327
(58) Field of Classification Search .................. None
See application file for complete search history.

(56) References Cited

U.S. PATENT DOCUMENTS

| 5,337,174 | A  | * | 8/1994  | Wada et al. ............ 349/119 |
| 6,177,032 | B1 | * | 1/2001  | Smith et al. ............ 264/1.34 |
| 6,552,763 | B1 | * | 4/2003  | Kouya ................ 349/96 |
| 6,964,814 | B2 | * | 11/2005 | Fujii et al. ............ 428/423.1 |
| 6,974,608 | B2 | * | 12/2005 | Shimizu et al. ......... 428/1.33 |
| 2004/0099973 | A1 | | 5/2004 | Liu et al. |
| 2006/0066946 | A1 | | 3/2006 | Liu et al. |
| 2006/0072057 | A1 | * | 4/2006 | Yano et al. ............ 349/117 |

FOREIGN PATENT DOCUMENTS

| CN | 1755396 A | 4/2006 |
| JP | 2004-168063 A | 6/2004 |
| JP | 2006-96793 A | 4/2006 |
| JP | 2006-124628 A | 5/2006 |
| WO | WO-2006098517 A1 | 9/2006 |

* cited by examiner

*Primary Examiner* — Arnel C Lavarias
(74) *Attorney, Agent, or Firm* — Birch, Stewart, Kolasch & Birch, LLP

(57) ABSTRACT

An optical film with super low retardation, including metal oxide nano-particles dispersed in a transparent resin having a three-dimensional crosslinking structure. The optical film has about 0-2 nm in-plane retardation (Ro) and almost zero out-of-plane retardation (Rth). The optical film can replace conventional triacetyl cellulose (TAC) as a polarizer protective film to improve black-white contrast and color shift on liquid crystal displays at wide viewing angles.

17 Claims, 3 Drawing Sheets ical film with super low retardation is provided. The optical
OPTICAL FILM WITH SUPER LOW RETARDATION AND POLARIZING PLATE CONTAINING THE SAME

CROSS-REFERENCE TO RELATED APPLICATIONS

This application is a Continuation-In-Part of application Ser. No. 10/954,824, filed on Sep. 30, 2004 now U.S. Pat. No. 7,486,442.

BACKGROUND OF THE INVENTION

1. Field of the Invention

The invention relates to an optical film with super low retardation and its application in polarizing plates.

2. Description of the Related Art

Liquid crystal displays (LCDs) are widely used in personal computers, digital cameras, cell phones, and televisions. Polarizer is an essential component of LCDs, which polarizes the incident light from random polarization into a specific polarization direction. LCDs are usually operated between two crossed polarizers, such that by controlling the voltage applied across the liquid crystal layer in each pixel, light can be allowed to pass through in varying amounts, correspondingly illuminating the pixel. There is an increasing demand for polarizers due to the growing LCD market.

The polarization function of the polarizer is obtained by orienting a light anisotropic absorber in a transparent polymer film. For example, a PVA-based polarizer can be obtained by allowing iodine or a dichromatic dye to be absorbed on polyvinyl alcohol (PVA) film, followed by uniaxial orientation by stretching.

As application fields of LCDs become wider, and durability requirements for polarizers become more severe as a result, polarizer protective films are commonly provided on both sides of the polarizer to improve durability and mechanical strength. Polarizer protective films also prevent dissociation of iodine ion of the polarizer in humid conditions. Triacetyl cellulose (TAC) has been the dominating material for polarizer protective films due to its high transparency, optically uniform appearance, and easy adhesion to polarizer.

Large-size LCDs have become increasingly popular in recent years. Along with such trends, lowering the birefringence of polarizer protective films is required for the optimization of viewing angle characteristics. Although TAC has a low in-plane retardation (Ro), its out-of-plane retardation (Rth) is relatively high, which results in low black-white contrast and color shift in liquid crystal displays at wide viewing angles. Thus, it is desirable to reduce Rth of polarizer protective films to improve wide viewing angle performance of LCDs, particularly in-plane-switching (IPS) LCDs.

Birefringence increases with the orientation degree of polymer chains. It is not easy to reduce Rth, however, due to the tendency of in-plane orientation of polymer chains. To overcome this problem, additives with negative intrinsic birefringence have been used to reduce birefringence. For example, Patent Publication Nos. WO 2006098517 and JP 2006096793 disclose a zero-birefringence polymer mixture, wherein an additive with negative intrinsic birefringence is used to compensate the positive intrinsic birefringence of the polymer. Patent Publication No. JP 2006124628 discloses a cycloolefin polymer with low birefringence, but its hydrophobic main chain and side chains are unfavorable to adhere to hydrophilic PVA polarizer. Patent Publications Nos. JP 2004168063 and US 20040099973 also disclose polycarbonate with low birefringence.

Accordingly, there exists a need in the art to provide an optical film with super low or zero retardation to improve wide viewing angle characteristics of LCDs.

BRIEF SUMMARY OF THE INVENTION

According to one aspect of the invention, an optical film with super low or zero retardation is provided. The optical film comprises a transparent resin having a three-dimensional crosslinking structure; and a plurality of metal oxide nanoparticles dispersed in the transparent resin; wherein the optical film exhibits in-plane retardation (Ro) of about 0-2 nm and an out-of-plane retardation (Rth) of about zero.

According to another aspect of the invention, a polarizing plate is provided. The polarizing plate comprises a polarizer with the disclosed optical film on at least one surface thereof as a protective film.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The super-low-retardation optical film of the invention mainly comprises a highly transparent resin and a plurality of metal oxide nanoparticles well dispersed in (and on) the transparent resin, thus giving a nanocomposite.

Figure 1:
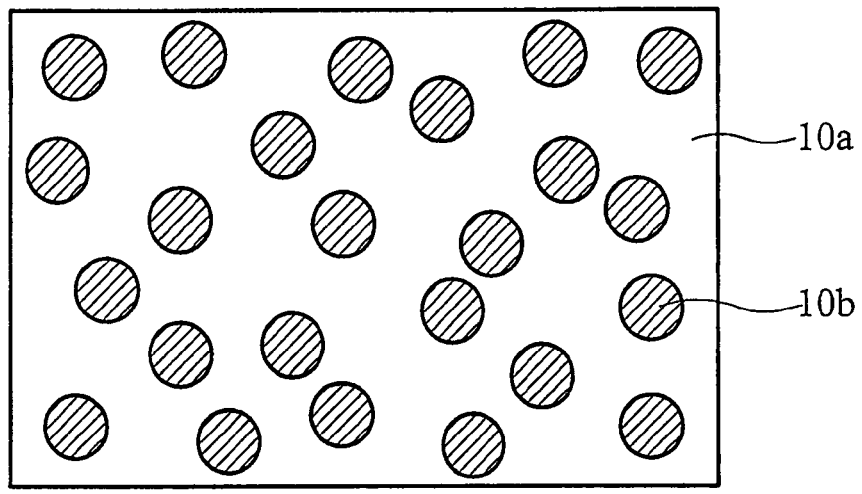
FIG. 1 is a schematic view of an embodiment of an optical film with super low retardation.

FIG. 1 is a schematic view of an embodiment of the super-low-retardation optical film. As shown in FIG. 1, the optical film 10 is a composite material comprising a transparent resin 10a as a matrix with nanoscale metal oxide particles 10b dispersed therein. The transparent resin 10a used herein has a three-dimensional crosslinking structure, that is, the polymer chains are orientated without directional specificity. Therefore, the transparent resin 10a is optically isotropic and has super low or zero birefringence. In addition, the nanoparticles 10b uniformly dispersed in the resin 10a further reduce the degree of directional specificity, thus improving optical isotropy. Furthermore, incorporation of the nanoscale particles may provide increased hardness, thermal dimension stability, hydrophilicity, and reduced moisture permeability.

The transparent resins used herein preferably provide transmittance of not less than 90%. Suitable transparent resins include but are not limited to epoxy resin, acrylic resin, or combinations thereof. Starting materials of the epoxy resin include monomers, oligomers, and polymers containing one or more oxirane rings. Representative examples of suitable epoxy resins include bisphenol A epoxy resin, bisphenol F epoxy resin, bisphenol S epoxy resin, phenol-novolak epoxy resin, cresol-novolak epoxy resin, alicyclic epoxy resin, hydrogenated or nitrogen-containing naphthalene type epoxy resin, and biphenyl type epoxy resin. These resins may be used individually or in a mixture of two or more, depending upon the specific application needs. Starting materials of the acrylic resin include those in forms of monomers, oligomers, or polymers. Representative examples include epoxy acrylate, polyamino methacrylate, polyester acrylate, 1,6-hexanediol diacrylate (HDDA), and hydroxyethyl methacrylate (HEMA). Likewise, these acrylic resins may be used individually or in a mixture of two or more, or even in combination with the above described epoxy resins.

The transparent resin may comprise UV-curable compositions, thermal-curable compositions, or combinations thereof. Thus, curing agents, such as ultraviolet (UV) curing agents, thermal curing agents, or combinations thereof, may be added in an effective amount to cure the transparent resin. Thermal curing agents for epoxy resins include anhydrides and partially esterified anhydrides, such as hexahydrophthalic anhydride (HHPA), tetrahydrophthalic anhydride (THPA), methyl tetrahydrophthalic anhydride (MTHPA), and methylhexahydrophthalic anhydride (MHHPA); triethylene diamine (TEDA); imidazoles such as 2-ethyl-4-methylimidazole, and 2-methylimidazole; phosphines such as triphenylphosphine, tetraphenylphosphonium tetrapenylborate, and o-diethylphosphorodithioate; and tetra-ammonium salts. UV curing agents for epoxy resins include but are not limited to cationic photoinitiators such as triaryl sulphonium hexafluoro antimonite, triaryl sulphonium hexafluoro phosphate and diaryl indonium salt. Preferred UV curing agents for acrylic resins include free radical initiators such as ketone initiators, phosphine initiators, and indonium salts. The weight ratio of the UV curing agent to the epoxy/acrylic resin is preferably about 0.03:0.15, more preferably about 0.05:0.1. The weight ratio of the thermal curing agent to the epoxy/acrylic resin is preferably about 0.6:1.3, more preferably about 0.9:1.1.

Furthermore, the transparent resin may be further incorporated with various additives commonly employed with polymers. For example, 10-50 phr (per hundred resin) of plasticizer may be added to improve processability, ductility, and utility of the transparent resin.

Contrary to the linear molecular chains of triacetyl cellulose (TAC), the molecular chains of the present transparent resin have a three-dimensional crosslinking structure and therefore have no directional specificity. As the molecular structure is optically isotropic, the transparent resin shows extremely low or no birefringence (Rth<5 nm). In addition, the crosslinking structure can provide enhanced thermal dimensional stability. In this regard, the transparent resin preferably has a glass transition temperature of about 80-190° C. by the choice of suitable starting materials.

The metal oxide nanoparticles of the invention have an average diameter of about 5-30 nm. As the size of the metal oxide nanoparticles is sufficiently small and the nanoparticles are uniformly dispersed in the resin matrix, a composite film with a transmittance of not less than 90% can be achieved. Examples of suitable metal oxide nanoparticles include but are not limited to particles of silica, $TiO_2$, $ZrO_2$, $Al_2O_3$, ZnO, MgO, or the like. These particles may be used individually or in a mixture of two or more.

The metal oxide nanoparticles may impart improved thermal dimensional stability due to a lower thermal expansion coefficient than the transparent resin. Thus, the composite film has a lower thermal expansion coefficient than counterparts in absence of the nanoparticles, and thereby an improved dimensional stability and planarity may be achieved. In addition, the metal oxide nanoparticles generally have a very high hardness and thus may serve as a reinforcement to impart the transparent resin with an increased hardness. In some cases where the pencil hardness is 3H or higher, a hard coat layer conventionally used for protecting the surface of the polarizing plate can be saved. A conventional hard coat layer is made of acrylic or epoxy resin with a thickness of about 5-10 μm. Furthermore, the metal oxide nanoparticles may increase the hydrophilicity of the optical film, thus improving adhesion to the hydrophilic polarizer.

The nanoscale particles are preferably present in an amount of about 5-50% by weight, based on the total weight of the optical film. It is found that the transmittance of the film is not seriously affected by the amount of the particles as long as they are sufficiently small. Accordingly, the amount of the nanoscale particle may exceed 50% by weight although is generally not required to be so. Commercially available metal oxide nanoparticles include those in powder forms or in liquid suspension, all of which are suitable for use herein.

Furthermore, known antioxidants and UV absorbers can be incorporated, either alone or in combination, in order to prevent deterioration of the optical film, and to improve reliability after formation of the polarizing plate. For example, UV absorbers may be added to absorb ultraviolet light below 380 nm. These antioxidants and UV absorbers are added usually in an amount of 0.1-3% by weight, based on the total weight of the optical film.

Figure 2:
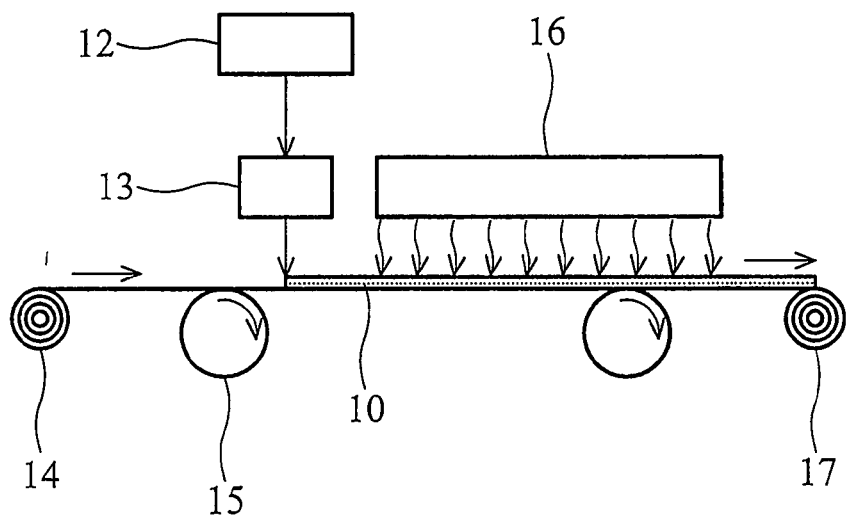
FIG. 2 is an example of an apparatus for fabricating the optical film of FIG. 1.

Referring now to the drawings, FIG. 2 shows a representative apparatus for fabricating the optical film. It should be noted that apparatus other than that shown in FIG. 2 can be used to fabricating the optical film of the invention. Starting materials including metal oxide nanoparticles, resin, curing agent, and so on are added to a blend tank 12 in a predetermined ratio and thoroughly mixed into a slurry. According to the invention, the slurry can be non-solvent (100 wt % solid content), or solvent-containing with a solid content of not less than 40 wt %. Preferably, the slurry mixture has viscosity between 200 and 6000cp to facilitate the subsequent coating. The slurry mixture is fed into a coating device 13 (roller or die head) and coated onto a releasable support sheet 14 unwound by a driving roller 15 and continuously carried at a fixed speed of for example, about 0.5-10m/min. The coated film is subsequently cured when passing through a UV- or heat-curing device 16 to give the desired film, which is then rolled onto a take-up roller 17. The resulting optical film 10 preferably has a thickness of about 20-100 μm, and more preferably about 30-80μm, considering the cost and physical properties. It should be noted that the optical film 10 can he easily released from the support sheet 14 as a free-standing film (without a support sheet). This feature allows easy handling of the optical film to assemble with polarizer.

The releasable support sheet 14 may be formed of stainless steel or thermal plastic polymers such as carbamate resins, acrylic resins, polyester resins, polyvinyl alcohols, ethylene-vinyl alcohol copolymers, vinyl chloride resins, polyvinylidene chloride resins, polynorbornene resins, polycarbonate resins, polyarylate resins, and the like.

Figure 3:
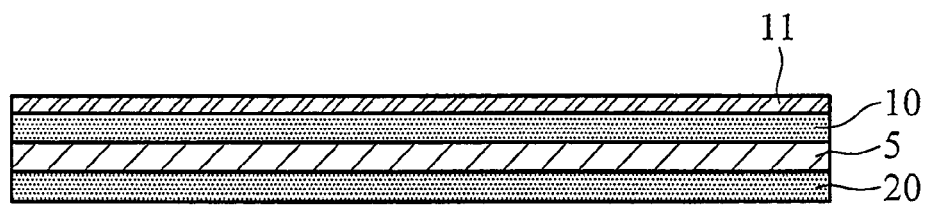
FIG. 3 is a schematic view of an embodiment of a polarizing plate utilizing the optical film of FIG. 1 as a protective film for polarizer.

FIG. 3 is a schematic view of an embodiment of a polarizing plate utilizing the super-low-retardation optical film 10 of FIG. 1 as a polarizer protector. As shown in FIG. 3, the polarizing plate 30 comprises a polarizer 5 sandwiched between two protective films, including the super-low-retardation optical film 10 as a first protective film and a second protective film 20. The super-low-retardation optical film may be provided on one or each of opposite surfaces of the polarizer 5. Thus, the second protective film 20 preferably has the same composition as the super-low-retardation optical film 10 of FIG. 1, or it can be a conventional protective film such as cellulose ester, polycarbonate, acrylate, polyester, polyolefin, norbornane, or the like. There is no particular limitation on the polarizer 5 which can be used in the invention, as long as it has a function as a polarizer. Examples thereof include PVA-based or polyene-based polarizer. The polarizer protective film 10 preferably has a thickness of about 20-100 μm, and more preferably about 30-80 μm, considering the cost and physical properties. In addition, an anti-glare (AG) or antireflection (AR) coating 11 may be provided on the polarizer protective film 10. An anti-glare coating typically has a thickness of about 2-10 μm. An antireflection coating typically has a thickness of about 0.1-0.2 μm.

In such a polarizing plate 30, if moisture permeability of polarizer protective film 10 is high, polarizing capability of the polarizer 5 can deteriorate. By employing the composite protective film 10 of the invention, it is possible to improve the optical durability of the polarizing plate, especially in high humidity. The composite protective film 10 generally has a moisture permeability not exceeding 80 g/m$^2$/24 hours. In some embodiments, it may have a moisture permeability of 60-70 g/m$^2$/24 hours or less, being about ⅙ of conventional TAC protective film.

The polarizing plate 30 is formed by laminating the protective film 10 of the invention with the polarizer 5 on at least one surface thereof. For example, the polarizer 5 and the protective film 10 can be adhered by use of transparent adhesive or a pressure-sensitive adhesive. In addition, a primer layer of polyurethane or the like may be provided on the protective film to enhance the adherence. Furthermore, surface treatment such as corona or plasma treatment of the protective film is preferably conducted before the lamination, whereby the surface thereof can be rendered hydrophilic to facilitate adhesion thereof to a polarizer. It is preferable that after surface treatment, the contact angle of distilled water on the surface of the protective film is not more than 15°.

The polarizing plate of the invention may be used in combination with other optical layers such as one or more of a reflective plate, a transflective plate, a retardation plate (a half wavelength plate and a quarter wavelength plate included), and a viewing angle compensation film. Especially preferable are a reflection type polarizing plate or a transflective type polarizing plate in which a reflective plate or a transflective reflective plate is further laminated onto a polarizing plate of the invention; an elliptically polarizing plate or circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

Figure 4:
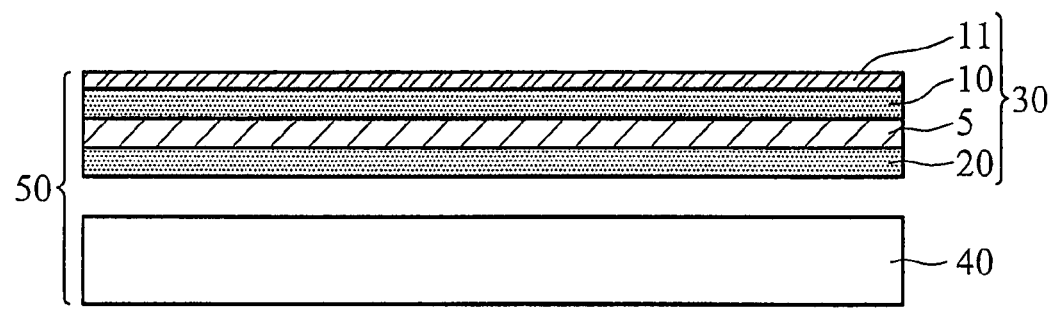
FIG. 4 is a schematic view of an embodiment of a visual display utilizing the polarizing plate of FIG. 3.

The polarizing plate of the invention may be used in manufacturing various visual displays such as liquid crystal displays, organic electro luminescence (organic EL) displays, and plasma display panel (PDP). For example, as shown FIG. 4, the liquid-crystal display device 50 can be formed by arrangement of the polarizing plate 30 according to the invention on one or each of opposite surfaces of a liquid-crystal cell 40. There is no particular limitation in the kind of the liquid-crystal cell or the method of driving the liquid-crystal cell. A suitable cell such as a TN (Twister Neumatic) liquid-crystal cell, a vertically aligned cell, or an IPS (in-plane-switch) cell may be used as the liquid-crystal cell. In addition, in assembling a liquid crystal display, suitable parts, such as a diffusion plate, prism array, lens array sheet, optical diffusion plate and backlight, may be installed in suitable position.

Experimental study shows that the super-low-retardation film of the invention exhibits an in-plane retardation (Ro) of about 0-2 nm (incident angle: from −40° to 40°), an out-of-plane retardation (Rth) of about zero, and a transmittance of not less than 90%. Therefore, it can replace the conventional triacetyl cellulose (TAC) polarizer protective film to provide improved black-white contrast and color shift on liquid crystal displays at wide viewing angles.

Accordingly, the composite optical film of the invention is characterized by super low retardation and high transmittance, as well as superior heat resistance and humidity resistance. Furthermore, the optical film can be fabricated by a non-solvent process to provide economical and environmental benefits and achieve a high degree of optical uniformity.

Without intending to limit it in any manner, the present invention will be further illustrated by the following examples. In the following example, a MEK (methyl ethyl ketone) silica sol available from Nissan Chemical under the tradename "MEK-ST" was used as nanoscale particles source, and the amount thereof was controlled at about 15% by weight, based on the total weight of the starting materials.

EXAMPLE

Methylhexahydrophthalic anhydride (MHHPA) as thermal curing agent was dissolved in a MEK silica sol, followed by addition of epoxy resin (EL-4221 from Union Carbide) and plasticizer (Triol from Union Carbide) to produce a slurry. The weight ratio of thermal curing agent, epoxy resin, and plasticizer was 1:1:0.1. The slurry was baked in a vacuum oven to remove solvent to achieve desirable solid content and viscosity, and coated onto an ARTON substrate using a precision coating machine. The coating was then cured in an oven.

Figure 5:
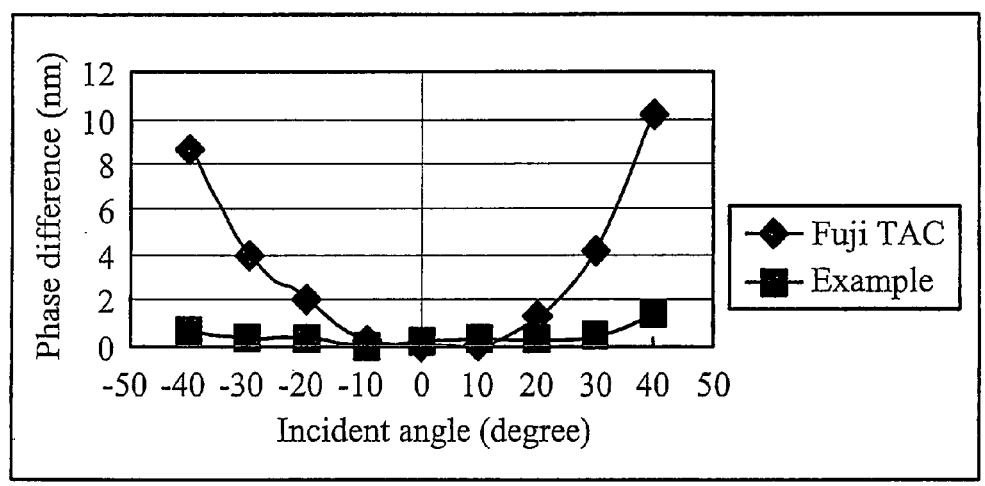
FIG. 5 is a diagram showing the measured birefringence of the super-low-retardation optical film of the Example and commercial TAC film.

Birefringence of the resulting optical film and a commercial TAC film (from Fuji Film) were measured by KOBRA-21ADH optical birefringence analyzer (from Oji Scientific Instruments) and the results are shown in FIG. 5. It was found that the optical film of the invention exhibited a Rth of about zero, while the commercial TAC exhibited a Rth of about 46 nm.

The optical film was measured for other characteristics including moisture permeability, transmittance, hardness, surface roughness, water contact angle, and so on. The results of measurement are listed in Table 1, and characteristics of the commercial TAC film are also listed for comparative purposes.

TABLE 1

|  | Epoxy/silica composite | TAC |
|---|---|---|
| Thickness (μm) | 80 | 80 |
| Specific gravity | 1.32 | 1.10 |
| Moisture permeability (g/m$^2$/24 hr) | 60-70 | about 400 |
| refractive index | 1.50 | 1.50 |
| Optical retardation value Rth (nm) | about 0 | about 46 |
| Transmittance (%) | 92 | 92 |
| Tg (° C.) | 80-90 | 60-80 |
| Coefficient of Thermal expansion (ppm/° C.) | 80-90 | 65-75 |
| hardness | 3H | HB |
| Surface roughness (Å) | 5-10 Å | <9.4 Å |
| Water contact angle after corona treatment | 14° | 35-40° |

The results in Table 1 indicates that the composite optical film of the invention was improved in terms of moisture permeability, hardness, and water contact angle compared to that of conventional TAC film. Other characteristics required for polarizer protective film, such as transmittance, birefringence, surface roughness were sufficiently presented therein.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical film with super low retardation, comprising:
    a transparent resin having a three-dimensional crosslinking structure, wherein molecular chains of the transparent resin are oriented without directional specificity and the transparent resin is optically isotropic; and
    a plurality of metal oxide nanoparticles dispersed in the transparent resin;
    wherein the optical film exhibits an in-plane retardation (Ro) of about 0-2 nm and an out-of-plane retardation (Rth) of about zero.

2. The optical film as claimed in claim 1, wherein the transparent resin comprises epoxy resin, acrylic resin, or combinations thereof.

3. The optical film as claimed in claim 2, wherein the epoxy resin comprises bisphenol A epoxy resin, bisphenol F epoxy resin, bisphenol S epoxy resin, phenol-novolak epoxy resin, cresol-novolak epoxy resin, alicyclic epoxy resin, hydrogenated or nitrogen-containing naphthalene type epoxy resin, or biphenyl type epoxy resin.

4. The optical film as claimed in claim 1, wherein the acrylic resin comprises epoxy acrylate, polyamino methacrylate, polyester acrylate, 1,6-hexanediol diacrylate (HDDA), or hydroxyethyl methacrylate (HEMA).

5. The optical film as claimed in claim 1, wherein the transparent resin comprises ultraviolet (UV)-curable compositions, thermal-curable compositions, or combinations thereof.

6. The optical film as claimed in claim 1, further having a transmittance of not less than 90%.

7. The optical film as claimed in claim 1, being a self-standing film.

8. The optical film as claimed in claim 1, having a thickness of about 20-100 μm.

9. The optical film as claimed in claim 1, wherein the metal oxide nanoparticles have a diameter of about 5-30 nm.

10. The optical film as claimed in claim 1, wherein the metal oxide nanoparticles comprise $SiO_2$, $TiO_2$, $ZrO_2$, $Al_2O_3$, ZnO, MgO, or combinations thereof.

11. The optical film as claimed in claim 1, wherein the metal oxide nanoparticles are about 5-50% by weight of the optical film.

12. The optical film as claimed in claim 1, further exhibiting a moisture permeability not exceeding 80 $g/m^2/24$ hr.

13. The optical film as claimed in claim 1, further being surface treated and exhibiting a water contact angle of not more than 15°.

14. The optical film as claimed in claim 13, wherein the surface treatment comprises corona or plasma treatment.

15. A polarizing plate comprising a polarizer and an optical film with super low retardation as set forth in claim 1 provided on at least one surface of the polarizer.

16. The polarizing plate as claimed in claim 15, further comprising a triacetyl cellulose film on an opposite surface of the polarizer.

17. The polarizing plate as claimed in claim 15, further being free of a hard coat layer on the optical film.

* * * * *